United States Patent [19]

Chu et al.

[11] 4,430,235

[45] Feb. 7, 1984

[54] POLYMERIC ANTIOXIDANTS

[75] Inventors: Nan S. Chu, Hartsdale; Lawrence Marlin, Yorktown Heights, both of N.Y.

[73] Assignee: Union Carbide Corporation, Danbury, Conn.

[21] Appl. No.: 284,389

[22] Filed: Jul. 17, 1981

[51] Int. Cl.³ .......................... C07F 7/08; C07F 7/10; C10M 3/22; C10M 3/44
[52] U.S. Cl. .................................. 252/49.6; 556/423; 556/425; 556/445; 556/449
[58] Field of Search ............... 556/445, 423, 425, 449; 252/49.6

[56] References Cited

U.S. PATENT DOCUMENTS 3,328,450  6/1967  Plueddemann ................ 556/445 X
3,579,467  5/1971  Brown .......................... 556/445 X

*Primary Examiner*—Paul F. Shaver
*Attorney, Agent, or Firm*—Paul W. Leuzzi

[57] ABSTRACT

Polymeric antioxidants comprising polyorganosiloxane backbones having joined thereto, by non-hydrolyzable linkages, aromatic antioxidant moieties.

5 Claims, No Drawings

POLYMERIC ANTIOXIDANTS

BACKGROUND OF THE INVENTION

1. Field of the Invention

This invention relates to antioxidants which comprise conventional antioxidant moieties linked to polysiloxane polymers.

2. Description of the Prior Art

U.S. Pat. No. 3,328,350 describes polymers which are the reaction products of certain substituted phenols with acyloxy-terminated polysiloxanes.

SUMMARY OF THE INVENTION

This invention provides polysiloxane polymers which have been modified by chemically attaching antioxidant bodies to their backbones. The resulting polymeric antioxidant agents possess chemical and physical inertness which makes them suitable for food, drug, and cosmetic applications, and to increase the oxidative stability of oils, lubricants, and of plastics.

DESCRIPTION OF THE PREFERRED EMBODIMENTS

Polymeric antioxidants of the present invention have the formula:

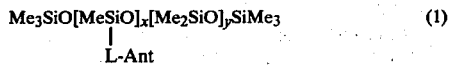

$$\text{Me}_3\text{SiO}[\text{MeSiO}]_x[\text{Me}_2\text{SiO}]_y\text{SiMe}_3 \quad (1)$$
$$|$$
$$\text{L-Ant}$$

wherein Me represents the methyl group, x can range from 2 or below to 100 or more, y can range from 20 or below to 300 or more, and the ratio of x:y can be 1:10 or greater and is preferably from 1:5 to 1:1. The symbol L represents the divalent group which connects the antioxidant moiety and the polysiloxane moiety together by covalent bonds. L is conveniently a saturated divalent aliphatic group which connects the silicon atom to the chromophoric group by a non-hydrolyzable covalent bond. Ant represents an aromatic antioxidant which imparts antioxidant properties to the polymer molecule.

One class of compounds particularly suitable for forming the linking group L is represented as $\text{CH}_2=\text{CH}(\text{CH}_2)_n\text{X}$ (2) wherein n is an integer of from 0-10 and more preferably in the range of 1 to 4 and X represents $-\text{NH}_2$, $-\text{NHR}$ (R=alkyl), and $-\text{OH}$ or groups such as $-\text{CN}$, halide, epoxy, ester, and the like which can be further converted to amino or hydroxyl groups. Addition of a terminal olefinic double bond to Si-H is well described in the literature and the reaction can be used to bond starting compound (2) to a hydrosiloxane. The functional group X gives a convenient site for the subsequent attachment of the intermediate addition product so formed to antioxidants. Alternately, the antioxidant can be attached to a silane by similar reactions prior to siloxane equilibration. Still another approach is to utilize an antioxidant molecule which itself contains a suitable precursor for L, e.g. an allyl group.

To form the antioxidant moiety, Ant in formula (1), any type of aromatic antioxidant molecule which can be covalently bonded to the polysiloxane polymer without losing its antioxidant properties can be utilized. Particularly suitable aromatic antioxidant molecules are those which can introduce phenolic hydroxy groups into the polymer, for example, 2-allyl-4-methylphenol, 2-allyl-6-methylphenol, 4-allyl-2-methoxyphenol, and 4-chloromethyl-2,6-di-tertiary-butylphenol. Conceptually, other compounds which are not strictly speaking phenols can also be used. For instance, hydroquinone monoalkyl ether can be chloromethylated and the resulting product can be linked to an aminoalkylated polysiloxane.

Examples of reaction sequences suitable for the preparation of compounds according to the present invention follow (in these, examples, x, y, and Me are as defined above):

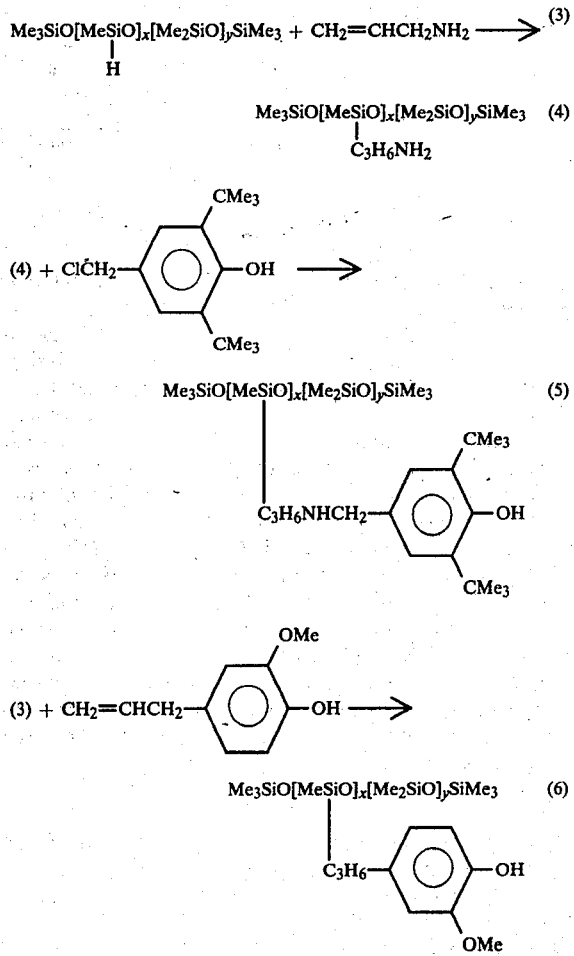

The molecular weight of the polymeric antioxidants of this invention can range from a few hundred to over fifty thousand. For practical reasons, e.g., viscosity, a molecular weight in the range of 1000 to 10,000 will generally be preferred.

The present polysiloxane antioxidants can be used to improve the oxidative stability of polyethylene, poly(vinyl chloride), polyamides, natural and synthetic diene rubbers and synthetic lubricants. Furthermore, because of the high molecular weight of the polymeric antioxidants, they may be useful as antioxidants for food, pharmaceutical, and cosmetic applications.

The following examples serve to illustrate the present invention. However, other specific embodiments within the scope of the claims will readily occur to those skilled in the art.

EXAMPLE I

Into a 250 ml, 4-neck, round bottom flask fitted with a mechanical stirrer, a condenser, a thermometer and an additional funnel, were added 100 g of Si-H fluid of the formula

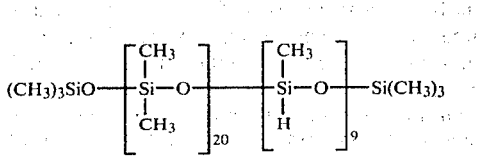

and 60 g of toluene. The mixture was purged with nitrogen before it was heated to 95° C. under nitrogen. Heating was stopped after the mixture reached 95° C. and 20 ml of a solution made with 70 g eugenol (4-allyl-2-methoxyphenol) and 25 ml of toluene were added. Catalyst (0.30 g of a 1.5 wt. % solution of dihydrogenplatinumhexachloride in dimethoxyethane) was then added. The remainder of the eugenol solution was added at such a rate that the temperature of the reaction mixture remained at 75°–80° C. The reaction was followed by the disappearing of the Si-H bond (IR spectrum). Toluene was removed under reduced pressure. The residue was dissolved in 200 ml of acetone and was washed with a mixture of acetone and water three times. The oil layer obtained was redissolved in toluene and the small amount of aqueous acetone separated was removed. Toluene was removed after the solution was dried over anhydrous sodium sulfate. The residue was a viscous oil and weighed 124 g.

EXAMPLE II

A pentaerythritol polyol ester lubricant (Hercolube ® 402) with and without one weight percent of the above prepared polymeric antioxidant was examined for antioxidant activity in a corrosion-oxidation modified Federal Test Method 791. The most significant modification in our system was the replacement of five metal test coupons with three metal test specimens, i.e., iron, copper, and lead. Briefly, the test consisted of bubbling air through 100 g of test lubricant at a temperature of 352° F. for a 72-hour period. Oxidation stability is based on the general condition of the fluid after the test was judged by visual observation, viscosity change, and metal weight change. It can be seen (Table I) by comparing the control test lubricant with the test lubricant containing a compound according to the present invention, the polymeric antioxidant does have antioxidant capabilities. This is demonstrated in the significantly lower viscosity change and the metal weight losses observed for treated sample.

TABLE I

| | | | Corrosion-Oxidation Test Results | | | | |
|---|---|---|---|---|---|---|---|
| | | Formulation | Viscosity at 100 C.°., cst | | % Viscosity | Metal Coupon wt. Change (gm) | | |
| Sample | | (conc.) | Before test | After test | Change | Iron | Copper | Lead |
| A | Hercolube ® 402 | No additive | 5.21 | 7.97[2] | +52.98 | +0.0001 | −0.0553 | −0.5959[1] |
| B | Hercolube ® 402 | 1 wt. % polymeric antioxidant | 5.48 | 7.39 | +34.85 | 0 | −0.0068 | −0.2048 |

[1]Lead specimen was partially coated with copper
[2]Fluid appeared darker than that of the sample containing 1 wt. % of the polymeric antioxidant

What is claimed is:

1. A polymeric antioxidant of the formula:

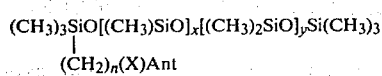

wherein x ranges from 2 to 100, y ranges from 20 to 300, the ratio of x:y is at least 1:10, n ranges from 2 to 12, X is selected from the group consisting of —NH—, —NHR—, —O— and —CHN—, n ranges from 2 to 12, X is selected from the group consisting of —NH—, —NHR—, —O— and —CHN—, and and Ant is an aromatic antioxidant moiety.

2. A polymeric antioxidant according to claim 1 wherein Ant is a phenolic moiety.

3. A polymeric antioxidant as in claim 1 wherein the ratio of x:y is in the range of from 1:5 to 1:1.

4. A polymeric antioxidant of the formula:

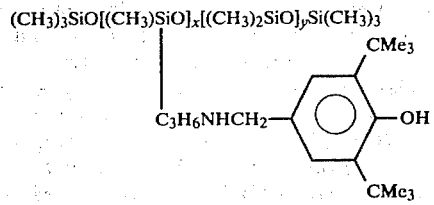

wherein x ranges from 2 to 100, y ranges from 20 to 300 and the ratio of x:y is at least 1:10.

5. A lubricant composition containing a minor amount of a polymeric antioxidant according to claim 1, 2, 3, or 4 and a major amount of a polyester lubricant.

* * * * *

UNITED STATES PATENT AND TRADEMARK OFFICE
CERTIFICATE OF CORRECTION

PATENT NO. : 4,430,235
DATED : February 7, 1984
INVENTOR(S) : Nan S. Chu, et al

It is certified that error appears in the above-identified patent and that said Letters Patent is hereby corrected as shown below:

Claim 1, line 2, please delete the present formula and substitute therefor the following:

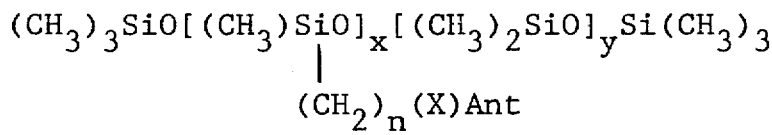

Claim 1, lines 6 to 8, please delete "n ranges from 2 to 12, X is selected from the group consisting of -NH-, -NHR-, -O-, and -CHN-, and".

Signed and Sealed this

Nineteenth Day of February 1985

[SEAL]

Attest:

DONALD J. QUIGG

Attesting Officer   Acting Commissioner of Patents and Trademarks